US008885373B1

(12) United States Patent
Valiani et al.

(10) Patent No.: US 8,885,373 B1
(45) Date of Patent: Nov. 11, 2014

(54) EARTH LEAKAGE CURRENT CONTROL FOR A MULTI-LEVEL GROUNDED INVERTER

(75) Inventors: Massimo Valiani, Arezzo (IT); David Martini, Arezzo (IT); Andrea Marcianesi, Arezzo (IT)

(73) Assignee: Power-One Italy S.pA., Arezzo (IT)

( * ) Notice: Subject to any disclaimer, the term of this patent is extended or adjusted under 35 U.S.C. 154(b) by 228 days.

(21) Appl. No.: 13/414,441

(22) Filed: Mar. 7, 2012

(51) Int. Cl.
H02M 7/48 (2006.01)
(52) U.S. Cl.
USPC .............................................. 363/71; 363/65
(58) Field of Classification Search
CPC ........ H02M 7/537; H02M 7/49; H02M 7/493
USPC ................ 363/65, 71, 131, 56.01, 34; 361/18
See application file for complete search history.

(56) References Cited

U.S. PATENT DOCUMENTS

| 5,748,459 | A * | 5/1998 | Yamada et al. ............. 363/56.03 |
| 6,259,017 | B1 * | 7/2001 | Takehara et al. ................. 307/82 |
| 7,099,169 | B2 * | 8/2006 | West et al. ..................... 363/132 |
| 7,596,008 | B2 * | 9/2009 | Iwata et al. ..................... 363/71 |
| 8,289,742 | B2 * | 10/2012 | Adest et al. ..................... 363/71 |
| 2001/0048310 | A1 * | 12/2001 | Takahashi ..................... 324/551 |
| 2003/0161166 | A1 * | 8/2003 | Mutoh ............................. 363/50 |
| 2010/0302819 | A1 * | 12/2010 | O'Brien et al. ................. 363/95 |
| 2012/0075898 | A1 * | 3/2012 | Sigamani et al. ............. 363/131 |
| 2012/0091817 | A1 * | 4/2012 | Seymour et al. .............. 307/82 |
| 2013/0093250 | A1 * | 4/2013 | O'Brien et al. ................ 307/82 |
| 2013/0222951 | A1 * | 8/2013 | Zhu et al. ........................ 361/18 |

FOREIGN PATENT DOCUMENTS

WO  WO2011124605  * 10/2011

* cited by examiner

Primary Examiner — Timothy J Dole
Assistant Examiner — Shahzeb K Ahmad
(74) Attorney, Agent, or Firm — Waddey Patterson; Mark J. Patterson; Gary L. Montle

(57) ABSTRACT

An energy conversion system and method perform active control of leakage current in multi-level grounded inverters. First and second subsystems each include positive and negative DC source terminals, at least first and second capacitors coupled between the positive and negative terminals to define a common bulk node for the respective subsystem, a DC/DC converter for regulating voltages across the capacitors, and an inverter. The inverters are coupled in parallel to an AC load. First and second grounding branches are homogenously coupled to terminals in the first and second subsystems, respectively, and to the same ground terminal. Control circuitry detects a leakage current value through the ground terminal, generates leakage current control signals for the respective DC/DC converters based at least in part on the detected leakage current value and a reference current value, and communicates the control signals to the DC/DC converters.

20 Claims, 5 Drawing Sheets

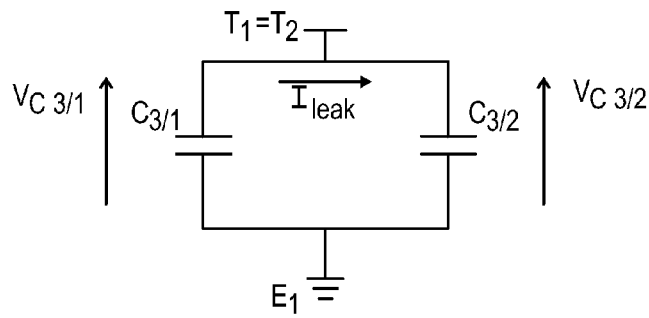
FIG. 2
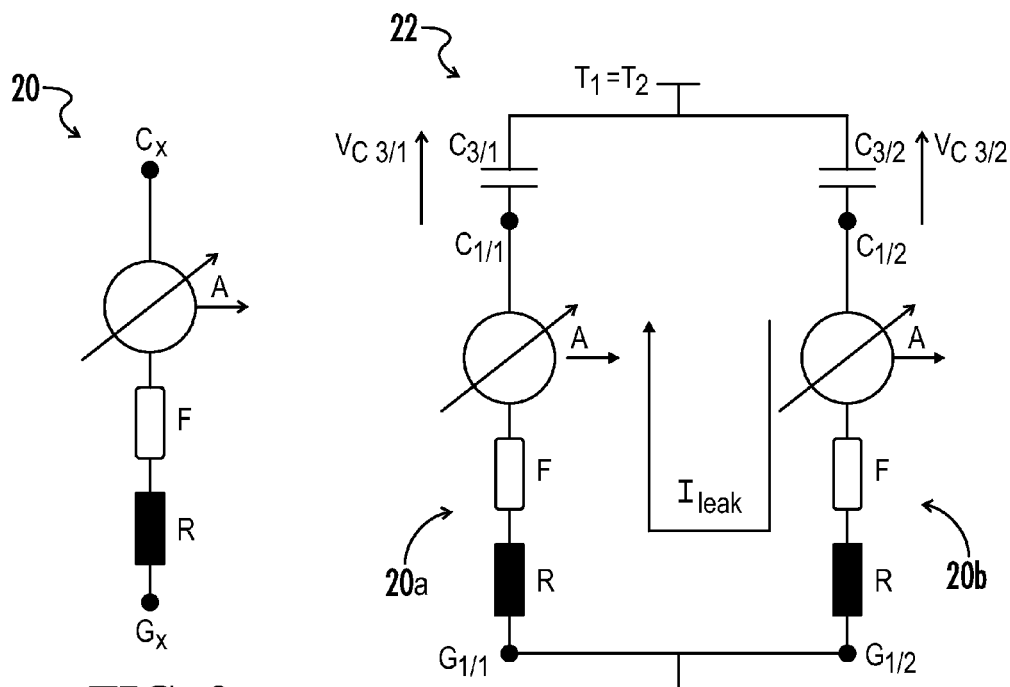
FIG. 3
FIG. 4

EARTH LEAKAGE CURRENT CONTROL FOR A MULTI-LEVEL GROUNDED INVERTER

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference:
None

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to the homogenous grounding of a collection of inverters and thereby controlling the associated leakage current. More particularly, energy conversion systems and methods of the present invention relate to the homogenous grounding of a plurality of multi-level inverters and applying corrective actions to associated subsystems based on detected leakage current through a common grounding point.

PWM-based energy conversion devices are electrical devices capable of transferring electrical energy from an input source (generally DC in inverter systems) to an output source (generally AC in inverter systems). It is common practice to perform grounding connections with respect to both of the source (for example, a DC panel PV array) and the destination (for example, an electrical motor) to prevent degradation phenomena to the source/destination machines. One common example in the photovoltaic industry is the need to ground the photovoltaic (PV) array (positive or negative terminal) to prevent solar panel degradations due to the charging of the parasitic capacitance with respect to ground. In other situations, for example an electrical motor drive, the motor frame is connected to ground to prevent an erosion effect of the rotor cage due to leakage currents through the internal bearings.

Grounding operations are typically simple for a single machine but some problems could arise where, for example, a collection of devices are sharing the same AC output. In this case, a multiple grounding process will need to use special isolation techniques to avoid huge recirculation currents between the electrical machines involved in the energy conversion process. A typical example in the photovoltaic industry involves parallelization on the same AC grid output of multiple inverters that use different DC PV array sources and that must be uniformly (positive or negative) grounded. In this scenario, to prevent huge current recirculation, a multiple winding AC transformer will be needed to ensure galvanic isolations between the inverters respect ground potential.

BRIEF SUMMARY OF THE INVENTION

In accordance with the present invention, an energy conversion system and associated methods are provided for performing active control of leakage current, with respect to, for example, multi-level grounded inverters.

In one aspect of the invention, a grounding branch is coupled between a photovoltaic panel grounding node and a safety ground for the system (e.g., PV plant). The current feedback coming from the grounding branch is used to control the leakage current among a plurality of paralleled inverters, avoiding unnecessary communication/data sharing between the various elements of the system.

In another aspect, an arrangement in accordance with the present invention is effective to connect different PV arrays (with different Maximum Power Point MPP voltages) to the same ground potential without affecting the possibility of coupling the related inverters to the same AC grid side. This aspect may further be advantageous with respect to medium voltage/low voltage (MV/LV) transformer design, availability and cost.

In another aspect, the reduction of leakage current among a plurality of paralleled inverters yields important benefits in terms of noise and electrical stress reduction.

In yet another aspect, an energy conversion system according to the present invention is still effective to detect ground faults in the PV panel stage by simply sensing the leakage current value and further via a protective fuse provided in the associated grounding branch. Therefore, it is possible to merely substitute a grounding branch of the present invention for existing grounding circuits used in ground fault protection schemes as previously known in the art.

In a particular embodiment of the energy conversion system of the present invention, first and second energy conversion subsystems each include positive and negative DC source terminals, at least first and second capacitors coupled between the positive and negative terminals to define a common bulk node for the respective subsystem, a DC/DC converter for regulating voltages across the capacitors, and an inverter. The inverter outputs are coupled in parallel to an AC load such as a three-phase AC grid. First and second grounding branches are homogenously coupled to terminals in the first and second subsystems, respectively, and to the same ground terminal. Control circuitry detects a leakage current value through the ground terminal, generates leakage current control signals for the respective DC/DC converters based at least in part on the detected leakage current value and a reference current value, and communicates the control signals to the DC/DC converters.

BRIEF DESCRIPTION OF THE SEVERAL VIEWS OF THE DRAWINGS

FIG. 2 is a circuit block diagram representing an embodiment of an equivalent grounding circuit with respect to the system of FIG. 1.

FIG. 3 is a circuit block diagram representing an embodiment of a grounding branch in accordance with the present invention.

FIG. 4 is a circuit block diagram representing the equivalent grounding circuit in accordance with the system of FIG. 1 and the grounding branch of FIG. 3.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. The term "signal" as used herein may include any meanings as may be understood by those of ordinary skill in the art, including at least an electric or magnetic representation of current, voltage, charge, temperature, data or a state of one or more memory locations as expressed on one or more transmission mediums, and generally capable of being transmitted, received, stored, compared, combined or otherwise manipulated in any equivalent manner.

The terms "energy conversion device" and "power converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

A particular embodiment of an energy conversion system in accordance with the present invention may be described in the context of a photovoltaic system throughout this description, but this is intended as exemplary only and is in no way intended as limiting on the scope of systems and methods described herein. For example, an equivalent configuration and associated processes could be adopted also for motor inverter systems, wind generation systems, and the like.

Figure 1:
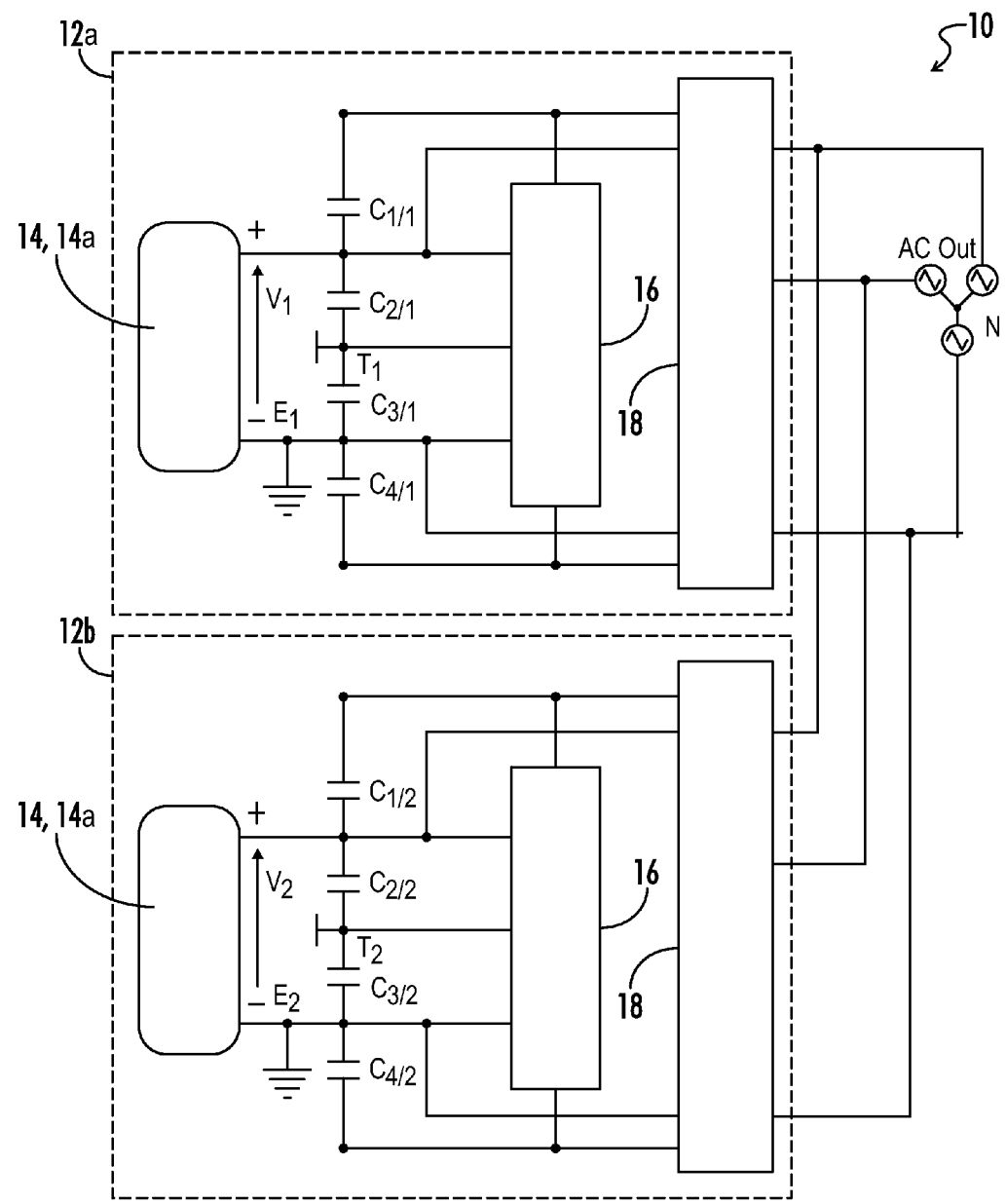
FIG. 1 is a circuit block diagram representing an embodiment of an energy conversion system in accordance with the present invention.

Referring now to FIG. 1, an embodiment of an energy conversion system 10 of the present invention includes first and second energy conversion subsystems 12a, 12b coupled in parallel. While two subsystems are illustrated here, a larger number of subsystems could further be coupled in parallel to a common output within the scope of the present invention.

For each of the subsystems 12a, 12b as shown, a PV array 14 is interfaced to an AC grid network using a two-stage system. A flying-capacitor bulk architecture (composed of a series capacitive network of capacitors C1/1 to C4/1 for subsystem 12a in FIG. 1) may be charged by a DC/DC subsection 16. In the configuration shown, capacitor C1/x will be charged sourcing energy from capacitor C2/x, and capacitor C4/x will be charged sourcing energy from capacitor C3/x. The input panel source is coupled between capacitors C2/x and C3/x, and the common bulk node $T_1$ is indicated accordingly. A dedicated multi-level inverter 18 connects the total bulk rail to the output (in this example, a three phase line) and feeds the AC grid with the desired power amount.

The inverter outputs from the first and second energy conversion subsystems are coupled in parallel into the same AC grid. The energy conversion subsystems are not limited to being in the same electrical PV field but can be independent and a different amount of power could be sourced from the two fields: the simplest example is a large PV field where subsystems 12a, 12b are two subsections of the PV array field with different irradiance and therefore different power delivering capabilities (i.e. different Maximum Power Point MPP points). The two PV subsystems will be safely grounded (points $E_1$ and $E_2$) homogenously, which means at the same polarity contact (both positive "+" contacts or negative "−" contacts).

A primary issue with the configuration as represented in FIG. 1, in the absence of further structure or control methods, is the leakage current throughout the grounding point due to the inverter output parallelization. An important property during inverter operation is depicted in the following equation:

$$\overline{V_{NT_1}} = \overline{V_{NT_2}} \tag{1}$$

In other words, the average voltage drop $V_{NT}$ between the neutral point N of the AC three-phase grid and the central point T of the bulk rail will be the same between all the PV systems that will be linked to the same AC transformer side. This property is a direct consequence of the AC voltage common connection.

An equivalent circuit for an average inverter leakage current due to common grounding is represented in FIG. 2. Because the two PV subsystems 12a, 12b may be independent and in general different, the two voltages $V_1$ and $V_2$ may therefore be different in which case a voltage drop into the equivalent circuit will be present. This may lead to a relatively large leakage current $I_{leak}$ between the two inverters that is virtually unlimited (or limited only by the parasitic series resistance of the elements) and can produce damage to the inverters themselves and be a serious risk with respect to safe operation of the equipment. One conventional technique to avoid this problem is to provide a soft-grounding technique or galvanic isolation between the two inverter outputs employing a double secondary-single primary MV/LV transformer, with an associated and significant cost increment at system level.

To overcome the grounding problems without the need of a special MV/LV transformer, grounding branches 20 according to the present invention may be coupled to the various subsystems. As represented in FIG. 3, an exemplary grounding branch 20 may include a series network of a current sensor A, a protective fuse F, and a power resistor R coupled between the grounding terminal $G_x$ and subsystem coupling node $C_x$.

Using this grounding branch 20 for each inverter 18 that must be coupled to the same AC transformer side, the average circuit represented in FIG. 2 may be rewritten as the grounding circuit 22 represented in FIG. 4, which includes first and second grounding branches 20a, 20b coupled to respective nodes on the first and second energy conversion subsystems 12a, 12b and defines an average inverter leakage current loop. Note that only the negative DC source terminal grounding example is represented and analyzed herein, as the positive DC source terminal grounding example is equivalent in terms of its arrangement and behavior.

In a straightforward application, the leakage current between the two inverters may be represented as:

$$I_{leak} = (V_{C3/1} - V_{C3/2})/2R \quad (2)$$

Figure 5:
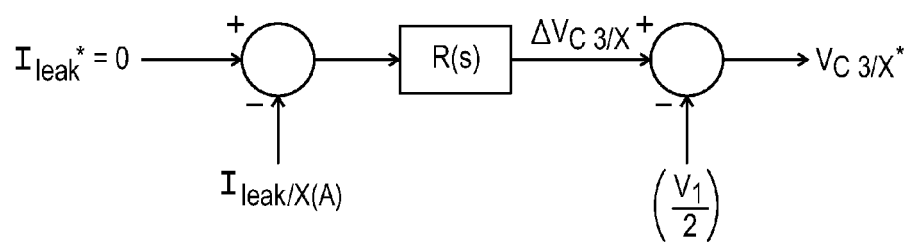
FIG. 5 is a block diagram representing an exemplary scheme for leakage current control in accordance with the present invention.

If the DC/DC stage is designed in such a way that it is effective to control the voltage across capacitors C2/x and C3/x, it is possible to regulate the numerator of Equation (2). With this assumption in mind (and as detailed further below), a possible control scheme for the leakage current may be as represented in FIG. 5 (note $X \in \{1, 2, \ldots N\}$ where N is the number of paralleled systems similar to those in 12a; in this exemplary embodiment, $X \in \{1, 2\}$). Generally stated, the action of the control loop may be intended for each inverter coupled in parallel to the same AC load.

The measured average leakage current may then be compared with a reference value (in the example shown zero, but various alternative references may be applied within the scope of the present invention) and the error is processed by using for example an R(s) regulation law. The corrective action produced is added to the normal balanced reference for the associated capacitor C3/x (e.g., a half of the PV panel voltage) and produces the voltage reference for the grounded capacitor that is realized by a control loop for the DC/DC stage.

It may be noted that the control circuitry effective to carry out the control loops, processes and functions recited herein may include a general purpose microprocessor, an application specific integrated circuit (ASIC), a digital signal processor (DSP), a microcontroller, a field programmable gate array, or various alternative blocks of discrete circuitry as known in the art, designed to perform functions as further defined herein, and may be embodied by individual control circuitry with respect to the various subsystems 12a, 12b and/or collective control circuitry with respect to the energy conversion system 10 itself.

As alluded to above, the corrective action described above may be applied among all the inverters coupled to the same AC load. Referring again to FIG. 4, the leakage current will be sensed as "positive" with respect to the first subsystem 12a and "negative" with respect to the second subsystem 12b, and the regulation action will be of opposite polarity with respect to the respective subsystems, discharging the overcharged capacitor and charging the undercharged capacitor. Accordingly, the integration of this control law among a plurality of subsystems with different PV MPP voltages may be stable and may further achieve the maximum dynamic bandwidth.

Stability and convergence properties of control methods according to the present invention may now be described in some detail. One assumption may be that the voltage loop bandwidth for the DC/DC converter (which is responsible for imposition across C3/x of the desired voltage $V_{C3/x}^*$ generated by the leakage current balancer) is substantially greater than the closed loop bandwidth of the leakage current balancer, as may typically be true for most practical cases. In accordance with this assumption, the control algorithm represented in FIG. 5 in conjunction with Equation (2) may define an equivalent large signal model of the average leakage current as represented in FIG. 6.

Figure 6:
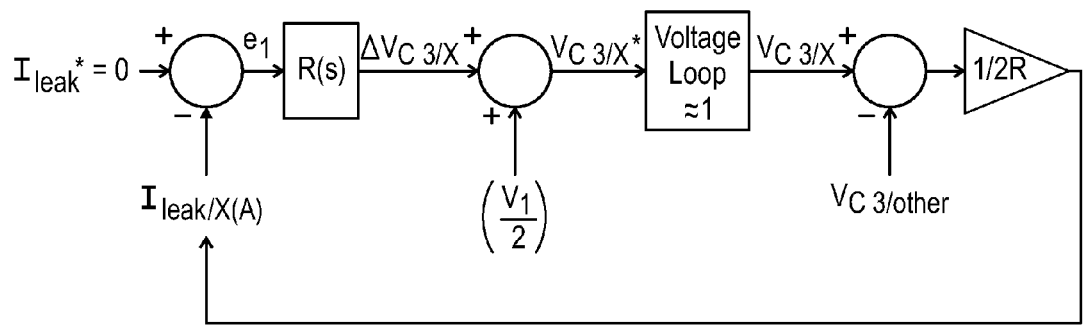
FIG. 6 is a block diagram representing an equivalent closed loop scheme with respect to the leakage current control of FIG. 5.
Figure 7:
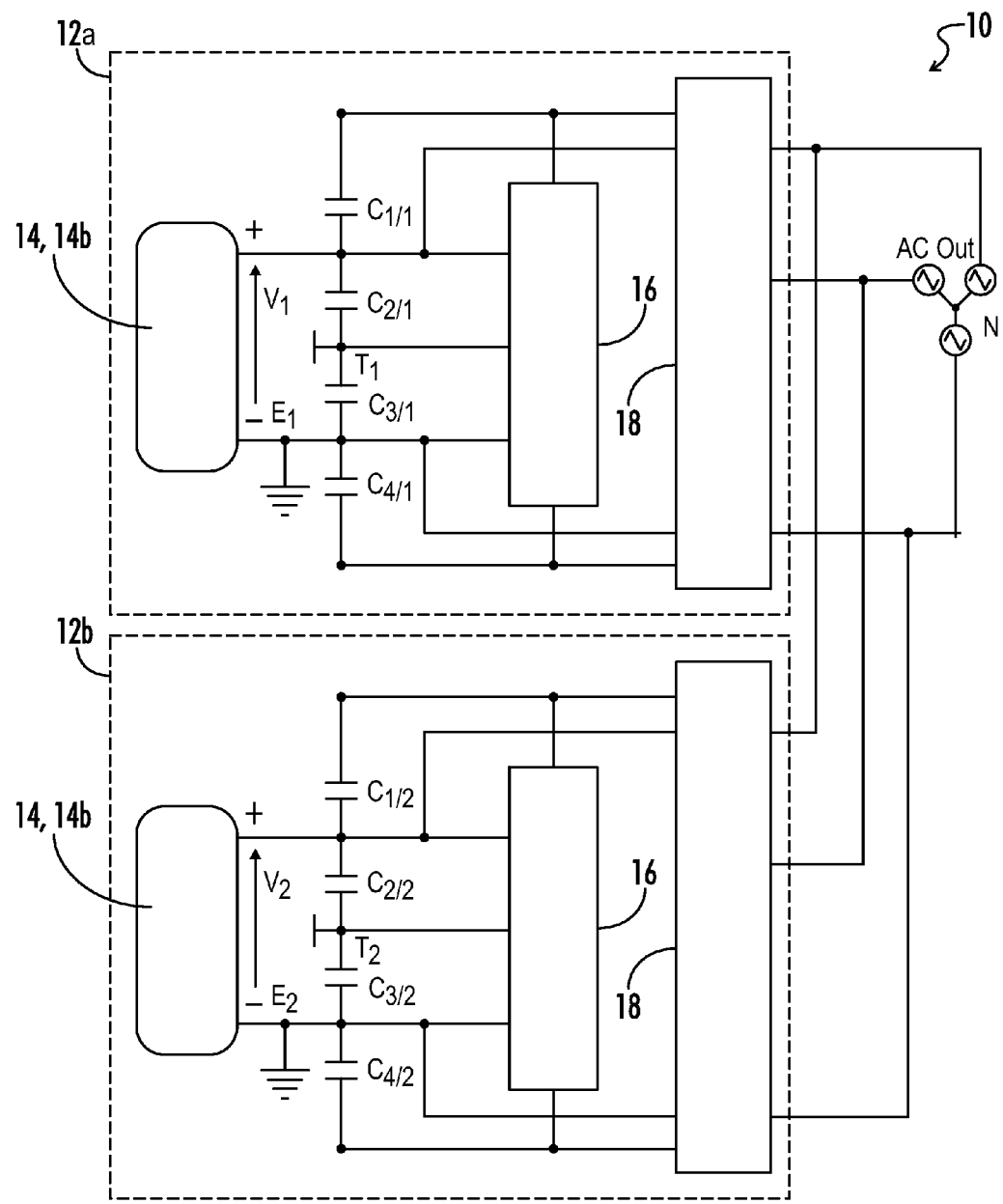
FIG. 7 is a circuit block diagram representing an embodiment of an energy conversion system in accordance with the present invention in which the DC sources 14b are wind turbine generators from a wind power generation system.
Figure 8:
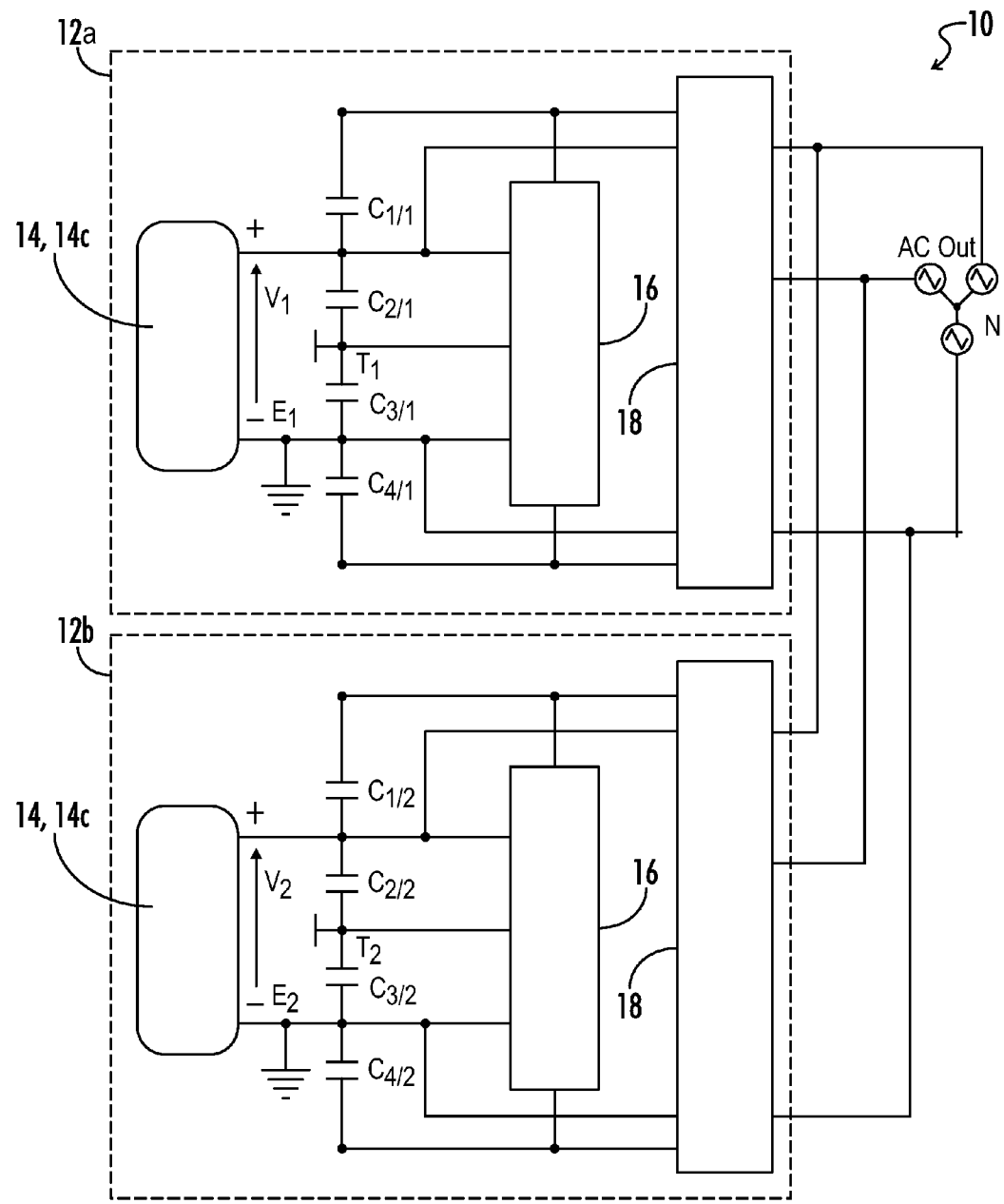
FIG. 8 is a circuit block diagram representing an embodiment of an energy conversion system in accordance with the present invention in which the DC sources 14c are electric storage devices from a motor drive system.

It may be noted from FIG. 6 that the $V_1$ signal and $V_{C3/other}$ signal are disturbances for the control loop and their effect should generally be "zero steady state" or at least controllable. In an embodiment of the present invention, consider the regulator R(s) as a simple integrator in the Laplace Transform Domain:

$$\Delta V_{C3/x} = (K_I/s) * e_I \quad (3)$$

In accordance with this assumption, the following partial transfer functions may be further presented, where $\omega_{cc} = K_I/2R$:

$$W_1(s) = \frac{I_{leak}}{I_{leak*}} = \omega_{cc} \frac{1}{s + \omega_{cc}} \quad (4)$$

$$W_2(s) = \frac{I_{leak}}{V_1} = \frac{1}{4R} \frac{s}{s + \omega_{cc}}$$

$$W_3(s) = \frac{I_{leak}}{V_{C3/other}} = -\frac{1}{2R} \frac{s}{s + \omega_{cc}}$$

The single closed loop dominant pole is present in each transfer function, so the system is stable and its bandwidth can be selected as desired.

Considering a three step variation (which is in for example the leakage current reference $I_{leak0}$, in the $V_1$ signal and the $V_{C3/other}$ signal), the time response may be expressed by the following equation:

$$R(t) = \left(I_{leak0} + \frac{V_1}{4R\omega_{cc}}\right) * u_{-1}(t) - \left(\frac{I_{leak0}}{\omega_{cc}} + \frac{V_1}{4R\omega_{cc}} + \frac{V_{C3/other}}{2R}\right) * e^{-\omega_{cc}*t} \quad (5)$$

The steady state response (t→+∞) is straightforward:

$$\overline{R} = (I_{leak0} + V_1/4R\omega_{cc}) \quad (6)$$

Selecting the appropriate level for the reference $I_{leak0}$ is possible to impose any reference to the leakage current (even zero), thereby realizing a complete control of the leakage current itself.

The voltage loop for the DC/DC converter itself may be realized within the scope of the present invention using various forms as are well known in the art (for example a dual channel boost topology, the first coupled to capacitor C3/x and the second coupled to capacitor C2/x) and detailed description herein may be omitted as redundant. One possible constraint for proper integration with the active leakage current control of the present invention may be the hierarchy of bandwidth:

$$\omega_{cc}^{Volt\_DC\_DC} < 10 * \omega_{cc} \quad (7)$$

Methods of the present invention may be executed according to the relationship of equation (7) to ensure that analysis is consistent with the aforementioned considerations, and such that minimal influence is imposed on the leakage control by the voltage control loop of the DC/DC converter.

Thus, although there have been described particular embodiments of the present invention of a new and useful Earth Leakage Current Control for Multi-Level Grounded Inverters it is not intended that such references be construed as limitations upon the scope of this invention except as set forth in the following claims.

What is claimed is:

1. An energy conversion system comprising:
   first and second energy conversion subsystems, each subsystem comprising a DC source, a DC/DC converter, and a DC/AC converter, the first and second DC/AC converters having respective output ends coupled in parallel to an AC load;
   a ground terminal;
   a grounding circuit comprising
      a first branch coupled on a first end to a node in the first energy conversion subsystem and on a second end to the ground terminal, the first branch including a first leakage current sensor, and
      a second branch coupled on a first end to a node in the second energy conversion subsystem and on a second end to the ground terminal, the coupling node in the second energy conversion subsystem being homogenous with respect to the coupling node in the first energy conversion subsystem, the second branch including a second leakage current sensor; and
   control circuitry effective to generate leakage current control signals for the respective DC/DC converters by
      determining an average leakage current comprising a first polarity with respect to the first energy conversion subsystem and a second polarity with respect to the second energy conversion subsystem from the respective first and second current sensors;
      comparing the determined average leakage current to a predetermined reference current value; and
      executing a regulator algorithm to calculate a corrective action comprising the second polarity with respect to the first energy conversion subsystem and a corrective action comprising the first polarity with respect to the second energy conversion subsystem based on the comparison.

2. The energy conversion system of claim 1, the first and second energy conversion subsystems further comprising a series capacitive network charged by the respective DC/DC converters, a first capacitor sourcing energy from a second capacitor to which it is coupled via a positive DC source terminal, a fourth capacitor sourcing energy from a third capacitor to which it is coupled via a negative DC source terminal, a node between the second and third capacitors defining a central bulk node for the associated subsystem.

3. The energy conversion system of claim 2, wherein the first ends of the first and second branches of the grounding circuit are coupled to the respective positive terminals of the first and second energy conversion subsystems.

4. The energy conversion system of claim 2, wherein the first ends of the first and second branches of the grounding circuit are coupled to the respective negative terminals of the first and second energy conversion subsystems.

5. The energy conversion device of claim 2, the respective DC sources comprising photovoltaic arrays from one or more photovoltaic energy fields.

6. The energy conversion device of claim 2, the respective DC sources comprising wind turbine generators from a wind power generation system.

7. The energy conversion device of claim 2, the respective DC sources comprising electric storage devices from a motor drive system.

8. The energy conversion system of claim 1, one or more of the first and second branches of the grounding circuit further comprising a protective fuse effective to disable the associated grounding circuit branch in response to a detected ground fault.

9. An energy conversion system comprising:
   a ground terminal;
   first and second energy conversion subsystems each further respectively comprising
      positive and negative DC source terminals,
      at least a first capacitor coupled to the positive DC source terminal and a second capacitor coupled to the negative DC source terminal, a node between the first and second capacitors defining a common bulk node for the respective subsystem,
      a DC/DC converter effective to regulate a voltage across each of the first and second capacitors, and
      a DC/AC converter, the first and second DC/AC converters having respective output ends coupled in parallel to AC three-phase load terminals;
   a grounding circuit comprising a first branch coupled on a first end to a node on one of the positive and negative DC source terminals in the first energy conversion subsystem and on a second end to the ground terminal, and a second branch coupled on a first end to a homogenous terminal in the second energy conversion subsystem with respect to the first branch and on a second end to the ground terminal,
   each of the first and second branches of the grounding circuit comprising a leakage current sensor, wherein the leakage current through the grounding terminal comprises a first polarity with respect to the first current sensor and a second polarity with respect to the second current sensor; and
   control circuitry effective to
      detect a leakage current value through the ground terminal,
      generate leakage current control signals for the respective DC/DC converters to apply a corrective action comprising the second polarity with respect to the first subsystem and a corrective action comprising the first polarity with respect to the second subsystem, and
      communicate the control signals to the DC/DC converters.

10. The energy conversion system of claim 9, the control circuitry further effective to generate the control signals by performing the steps of:
    comparing the detected leakage current to a predetermined reference current value; and
    executing a regulator algorithm to calculate the corrective action for the energy conversion subsystems based on the comparison.

11. The energy conversion system of claim 10, the control circuitry further effective to independently apply the corrective action to a reference voltage associated with the respective DC sources and to generate a control signal representing a corrected reference voltage for the associated DC/DC converter.

12. The energy conversion system of claim 9, the first and second energy conversion subsystems further comprising:
    a series capacitive network including the first and second capacitors coupled between the positive and negative terminals, one or more capacitors sourcing energy from the first capacitor, one or more capacitors sourcing energy from the second capacitor,
    the DC/AC converter comprising a multi-level inverter coupled to the series capacitive network.

13. The energy conversion system of claim 12, the first ends of the first and second branches of the grounding circuit coupled to the respective positive terminals of the first and second energy conversion subsystems.

14. The energy conversion system of claim 12, the first ends of the first and second branches of the grounding circuit coupled to the respective negative terminals of the first and second energy conversion subsystems.

15. The energy conversion device of claim 12, the respective DC sources comprising photovoltaic arrays from one or more photovoltaic energy fields.

16. The energy conversion device of claim 12, the respective DC sources comprising wind turbine generators from a wind power generation system.

17. The energy conversion device of claim 12, the respective DC sources comprising electric storage devices from a motor drive system.

18. The energy conversion system of claim 9, one or more of the first and second branches of the grounding circuit further comprising a protective fuse effective to disable the associated grounding circuit branch in response to a detected ground fault.

19. A method of reducing leakage current for an energy conversion system comprising first and second energy conversion subsystems each further respectively having a first capacitor coupled to a positive DC terminal and a second capacitor coupled between the first capacitor and a negative DC terminal, a DC/DC converter effective to regulate a voltage across each of the capacitors, and an inverter, the inverters having respective output ends coupled in parallel to an AC three-phase load, the method comprising:

homogenously coupling DC terminals from both of the first energy conversion subsystem and the second energy conversion subsystem to the same ground terminal;

detecting a leakage current value through the ground terminal, the leakage current through the grounding terminal comprising a first polarity with respect to the first energy conversion subsystem and a second polarity with respect to the second energy conversion subsystem;

generating leakage current control signals for the respective DC/DC converters to apply a corrective action comprising the second polarity with respect to the first energy conversion subsystem and a corrective action comprising the first polarity with respect to the second energy conversion subsystem; and communicating the control signals to the DC/DC converters.

20. The method of claim 19, the step of generating leakage current control signals for the respective DC/DC converters further comprising the steps of:

comparing the detected leakage current to a predetermined reference current value; and executing a regulator algorithm to calculate the corrective action for the energy conversion subsystems based on the comparison.

* * * * *